United States Patent Office 2,720,936
Patented Oct. 18, 1955

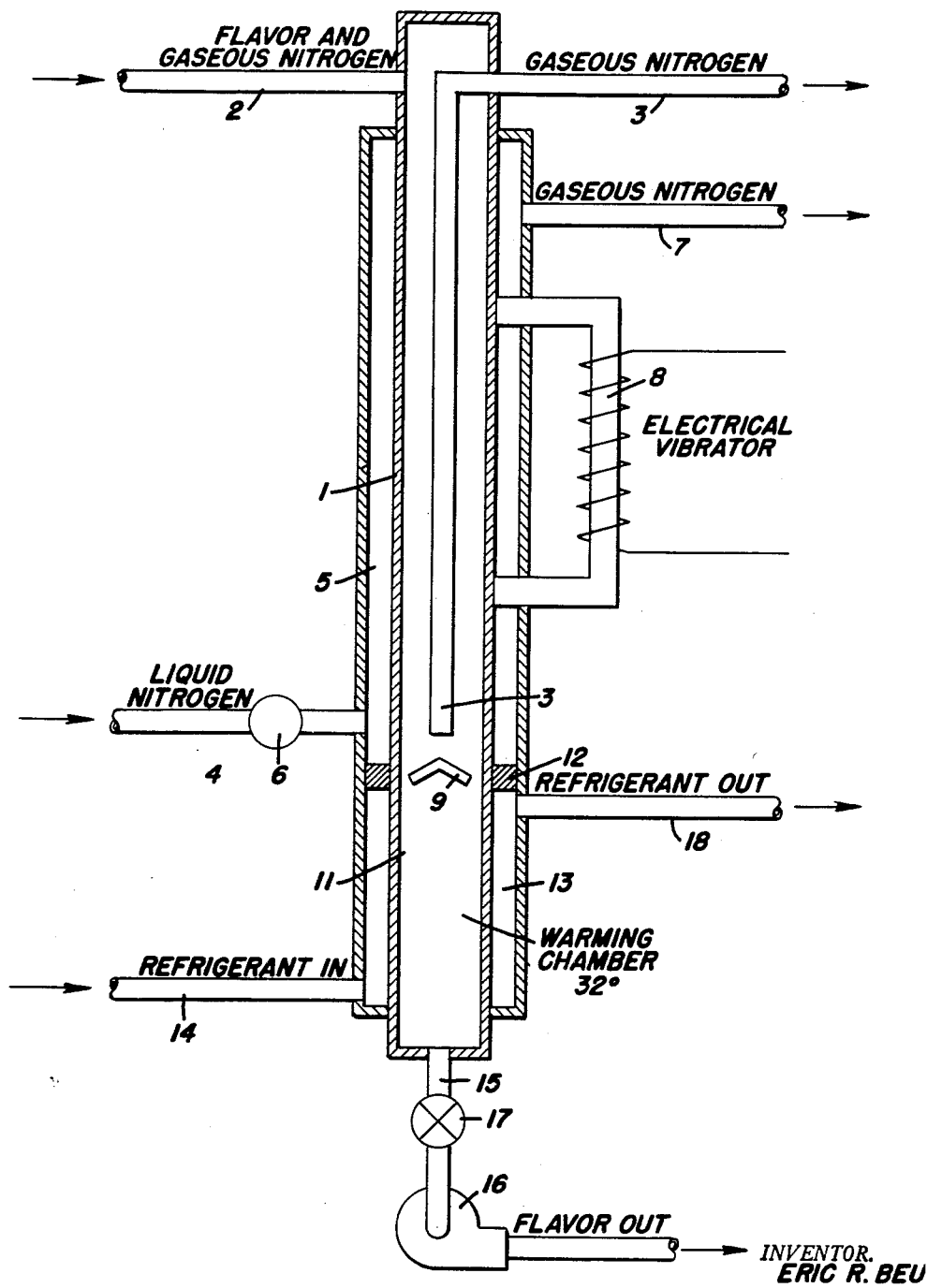

2,720,936

APPARATUS FOR RECOVERING VOLATILES

Eric R. Beu, Churchville, N. Y.

Original application June 24, 1950, Serial No. 170,207, now Patent No. 2,666,707, dated January 19, 1954. Divided and this application December 16, 1953, Serial No. 398,568

4 Claims.  (Cl. 183—32)

This invention relates to an apparatus for recovering volatiles or removing esters and other components of flavors and aromas from a gaseous mixture containing the volatiles, with more particular reference to recovering the natural aroma and flavoring from orange juice and other fruit and vegetable juices and liquid foods, and it has for its purpose to afford an apparatus in which the esters and flavor and aroma components are separated from the gas in the form of crystals which are liquefied and the liquid continuously drawn off for mixing with a concentrate or otherwise used.

The invention enables removing esters and other flavor and aroma components from fruit juice before evaporation or dehydration of the main body of juice, and thereafter added to the dehydrated mass to restore substantially the entire volume of esters and other flavor and aroma components, and produce a concentrate which when added to water provides a beverage or food possessing substantially the same flavor and aroma characteristics as in its original and natural state.

The general practice in concentrating orange juice has been to retain about 10% of the total volume in its natural state and mix such 10% with the concentrate produced from the remaining 90%, in order to simulate the flavor and aroma of the original juice, but a large percentage of the aroma and flavor components are lost in condensing the water of the 90% or large total volume from which the concentrate is formed, and it is a particular purpose of the invention to afford apparatus that enables recovering from the entire volume of juice substantially all of the flavor and aroma components, so that the recovered volatiles can be added to the concentrate, and when combined therewith in proper proportions serve to maintain therein substantially the same fresh flavor and aroma as in the original juice.

The invention also enables condensing and removing esters and aromas, odors, or scents from solids, semisolids, liquids, semi-liquids, gases or other fluids, and condensing such components into a concentrate.

The invention is particularly useful in recovering volatiles from a mixture of non-condensable gas and volatile flavor and aroma components, such gas being inert and non-reactant at temperatures of approximately 60° F. and below, such as nitrogen or any other inert gas while maintaining the gaseous mixture at a sub-atmospheric pressure.

Such gas mixed with a small volume of juice and the volatile components of flavor and aroma carry the volatiles to a condenser where they are subjected to a refrigerant at a very low temperature of approximately from +32° F. to —459° F., causing the flavor and aroma esters and other components to crystallize and adhere to the wall of the condenser in the form of snow.

This snow or crystal formation is removed as by an electrical vibrator in contact with or otherwise operatively associated with the wall of the condenser, and which causes the crystals to fall to a warming chamber below the condenser and preferably beneath a baffle located under a gas outlet which conducts the gas from the condenser after removal of the esters and flavor and aroma components, which after falling in crystal form into the warming chamber are liquefied and drawn off continuously for mixing with a concentrate produced by any conventional methods.

To these and other ends, the invention consists in the construction and arrangement of parts that will appear more clearly from the following description when read in conjunction with the accompanying drawing, the novel features being pointed out in the claims following the specification.

The drawing is a diagrammatic sectional view of an apparatus constructed in accordance with a preferred embodiment of the invention.

This application is a division of application Serial No. 170,207, filed June 24, 1950, Patent No. 2,666,707, January 19, 1954, and referring more particularly to the drawing which shows one practical form of the invention, 1 designates a condenser or trap into which a gaseous mixture is introduced in any suitable fashion through inlet pipe 2, such gaseous mixture consisting of the volatile components of orange juice or other fruit or vegetable juices or liquids together with a normally non-condensable gas such as nitrogen gas, helium, argon, xenon, krypton, carbon dioxide, or any mixture of these which is inert or non-reactant at low temperatures with orange juice or other fruit or vegetable juices or liquids, and which when mixed with such juice functions to remove the esters and other flavor and aroma components by desorption and to carry them to the condenser or trap where the volatiles are condensed out of the gas at low temperatures into the form of crystals or snow and recovered in liquid form.

The orange or other fruit or vegetable juice, in relatively small volume mixed with the nitrogen or other non-condensable gas and maintained under subatmospheric pressure, is fed to the condenser trap through inlet pipe 2 as illusttrated near the top of the condenser chamber 1, while 3 designates a gas outlet pipe leading from near the bottom of the condensing chamber 1 upwardly and outwardly, whence the nitrogen or other gas is carried off and circulated for mixture with a fresh supply of juice in small volume and volatiles from a much larger volume of juice, or otherwise disposed of.

The esters and other volatiles or flavor and aroma components are subjected to an extremely low temperature and crystallized in the condenser or trap 1 through the instrumentality of liquid nitrogen which is supplied through an inlet pipe 4 to a refrigerant chamber 5 surrounding the condensing chamber 1, while 6 is a pump which is used to control the supply of liquid nitrogen to the refrigerant chamber 5. Liquid nitrogen enters the refrigerant chamber 5 through inlet pipe 4 at a temperature of —344° F. and above, causing the esters and other volatile flavor and aroma components within the condenser which are maintained at approximately the same temperature to crystalize on the inside of the wall of the condensing chamber 1 in the form of a light snow-like material while the nitrogen or other gas is carried off through the outlet pipe 3 as already described.

The gaseous nitrogen remaining in refrigerant chamber 5 after its cooling of the condensing chamber passes out through pipe 7, whence it may be conducted to any suitable turbocompressor and condenser and returned through an expansion valve in the form of liquid nitrogen to inlet pipe 4, and the supply of liquid nitrogen can be continuously furnished to the refrigerant chamber 5 in this or any other desired manner.

8 designates an electric or other suitable vibrator extending through the outer wall of the refrigerant chamber 5 and attached to or otherwise operatively associated with the wall of the condensing chamber 1, and vibrator 8 operates to loosen the crystals or snow as they form on the inner surface of the wall of the condensing chamber 1. The crystals or snow are thus permitted to fall by gravity downwardly around the edges of a baffle 9 located under the bottom of the outlet pipe 3 between the refrigerant chamber 5 and the warming chamber 11 located therebeneath and separated by a wall 12, while the baffle 9 is spaced from the surrounding inner surface of the condensing chamber 1.

The warming chamber 11 is surrounded by a jacket or refrigerant chamber 13 to which is connected an inlet pipe 14 to receive from any suitable source a refrigerant that is conducted into the chamber 13 and operates to maintain the warming chamber 11 at a temperature of approximately 32° F.

Thus the refrigerant or brine passing through pipe 14 maintains the walls of the warming chamber 11 at a temperature of approximately +32° F., causing the snow or crystals constituting the flavor and aroma components to liquefy in the warming chamber 11, whence they are continuously conducted off through a pipe 15 by a pump 16 of the Jabsco type, while 17 designates a controlling valve in pipe 15. 18 is an outlet pipe for conducting refrigerant from the refrigerant chamber 13.

In operation, fruit or vegetable juice or other liquid in relatively small volume mixed with a large volume of nitrogen or other gas and a large volume of volatile flavor and aroma components aer carried at subatmospheric pressure to the condensing chamber 1 where the gaseous mixture is subjected to very low temperatures, causing the esters and flavor and aroma components to collect on the wall of the condenser in the form of snow or crystals. The crystals are loosened from the wall of the condenser by suitable means such as an electric vibrator in contact with the wall of the condenser, and fall thence downwardly into the warming chamber where they are subjected to the action of a warming fluid that liquefies the crystals. The flavor and aroma components are drawn off from the warming chamber continuously, and can then be mixed with the concentrate from the juice or liquid, from which the aroma components may have been previously separated.

While the invention has been described with reference to the particular construction herein shown, it is not confined to the exact arrangement or details shown, and this application is intended to cover such changes or modifications as may come within the purposes of the improvments and the scope of the following claims.

I claim:

1. Apparatus for recovering esters and other volatile components of flavors and aromas from a mixture of flavor and gaseous nitrogen comprising a condensing chamber, a warming chamber immediately under and forming a continuation of the condensing chamber, a flavor and gaseous nitrogen inlet and a flavor and gaseous nitrogen outlet communicating with the condensing chamber, refrigerant chambers located outside of and surrounding the condensing and warming chambers, and a vibrator extending from outside the refrigerant chamber through the refrigerant chamber which surrounds the condensing chamber and having contact with the wall of said condensing chamber, said vibrator acting to loosen frozen crystals from the wall of said condensing chamber and permit their falling from the condensing chamber into the warming chamber below.

2. Apparatus for recovering esters and other volatile components of flavors and aromas from a mixture of flavor and gasous nitrogen comprising a condensing chamber, a warming chamber immediately under and forming a continuation of the condensing chamber, a flavor and gaseous nitrogen inlet at the top of said condensing chamber, a flavor and gaseous nitrogen outlet at the bottom of said condensing chamber, refrigerant chambers located outside of and surrounding the condensing and warming chambers, and vibrating means extending from outside the refrigerant chamber through the refrigerant chamber which surrounds the condensing chamber and having contact with the wall of said condensing chamber, said vibrating means acting to vibrate said wall and loosen crystals therefrom to permit their falling from the condensing chamber into the warming chamber below.

3. Apparatus for recovering esters and other volatile components of flavors and aromas from a gaseous mixture comprising a condensing chamber, a warming chamber below the condensing chamber and communicating therewith, a baffle located between the condensing chamber and the warming chamber, a gas inlet at the top of the condensing chamber, a gas outlet at the bottom of the condensing chamber above said baffle, a vibrator attached to the wall of the condensing chamber, and refrigerant chambers surrounding the condensing and warming chambers.

4. Apparatus for recovering esters and other volatile components of flavors and aromas from a gaseous mixture comprising a condensing chamber, a warming chamber below the condensing chamber and communicating therewith, a baffle located between the condensing chamber and the warming chamber, a gas inlet at the top of the condensing chamber, a gas outlet at the bottom of the condensing chamber above said baffle, refrigerant chambers surrounding the condensing and warming chambers, and a vibrator extending through the refrigerant chamber around the condensing chamber and in contact with the wall of said condensing chamber.

References Cited in the file of this patent

UNITED STATES PATENTS

| | | |
|---|---|---|
| 2,075,237 | Sexton | Mar. 30, 1937 |
| 2,183,496 | Peters | Dec. 12, 1939 |
| 2,214,838 | McGavock | Sept. 17, 1940 |
| 2,351,163 | Thomas | June 13, 1944 |
| 2,375,256 | Soday | May 8, 1945 |
| 2,455,314 | Pietzsch | Nov. 30, 1948 |
| 2,514,797 | Robinson | July 11, 1950 |